Patented Mar. 5, 1946

2,395,836

UNITED STATES PATENT OFFICE 2,395,836

CATALYST MANUFACTURE

John R. Bates, Swarthmore, Pa., assignor to Houdry Process Corporation, Wilmington, Del., a corporation of Delaware No Drawing. Application December 24, 1941, Serial No. 424,237

5 Claims. (Cl. 252—254)

The present invention relates to new and improved methods of catalyst manufacture, and to catalysts produced by such methods.

It has heretofore been proposed to employ mixed oxide catalysts containing alumina and an easily reducible oxide, such as an oxide of molybdenum, chromium or vanadium, in various processes, particularly in processes involving hydrocarbon dehydrogenation, for example, cracking and reforming. The methods heretofore known for the preparation of these catalysts have resulted either in reasonably active and stable but quite expensive materials, or else less expensive but also less active and stable products. Thus, if it is desired to prepare a highly active, mechanically stable contact mass of this type, the alkali metal content should be held low. In order to remove alkali metal it has been necessary to wash hydrogels or gels which have been dried but not calcined. This washing procedure results in large losses of molybdenum, chromium, or vanadium in wash waters so dilute that it is not feasible commercially to effect recovery. Furthermore, washing of voluminous hydrogels is a substantially expensive operation. Since it is desirable for the contact material to be formed in pieces, such as pellets, or the like, high strength is desirable. The contact materials formed as pellets from washed gels are mechanically weak, which is an additional drawback of this procedure. This defect, however, is general with alumina-molybdenum oxide, alumina-chromium oxide, and alumina-vanadium oxide catalysts made by precipitation processes at present known in the art. If the washing step is omitted in order to conserve the soluble oxide, the contact materials produced are not only weak mechanically, but they are also of low activity and low stability.

Accordingly, objects of the present invention are to provide new and improved methods of catalyst preparation; to provide methods for the economical preparation of strong and active mixed oxide catalysts containing alumina and a soluble, reducible oxide; and to provide mixed oxide catalysts containing alumina and a soluble, reducible oxide, which catalysts have high strength, activity and stability.

In accordance with the present invention, mixed hydrogels are prepared by precipitation in the presence of volatile salts, and the hydrogels so prepared are dried and then mixed with a hydrogel containing silica and alumina. This mixture is then calcined to drive off the occluded volatile salts and simultaneously to develop the strength of the catalyst so produced.

In the preparation of the gel containing alumina and a soluble, reducible oxide, it is preferred that the alumina be derived from an aluminum salt, as distinguished from the aluminates. The soluble oxide is introduced as such or is preferably derived from a metallate salt, as for example ammonium molybdate, ammonium chromate, and ammonium vanadate. By mixing solutions of these two types of compounds, a precipitated gel containing the two is obtained. The gel may precipitate in the form of a jelly, including all of the reactant solution, or it may be in the form of a gelatinous precipitate which separates from the reactant solutions. It should be noted that as used herein the term "precipitate" is employed to indicate formation of gel from sol or solution regardless of the physical form which it assumes. Independently of which form the gel takes, the salt produced by reaction is occluded by the gel. The salt which is occluded may be adsorbed, absorbed or mechanically held. Dependent upon the ratio of the two salts added, additional volatile basic or acidic material may be introduced in order to carry the reaction to completion or to promote the formation of the gel. The metal salt, the metallate, and the additional reagent if used, are so chosen that the occluded salt is a volatile salt, as for instance ammonium nitrate or ammonium chloride. The hydrogel so produced is then dried and ground without removal of the occluded salt.

While it has been indicated that the mixed oxide gels are preferably produced by coprecipitation, it is obvious that the process of the present application is applicable likewise to methods involving the separate preparation of the two, and mixing in moist state. In either case, the occluded materials produced during preparation of the hydrogel should be volatile at the temperature at which the catalyst is calcined prior to or during use.

The ratio of alumina to the other oxide in the gel is dependent upon the intended use of the catalyst. In general, on dry basis, the alumina constitutes at least a 50% of the gel, but in some instances lower proportions of alumina, in the range of 25% to 50%, are desirable.

To the ground mixed gel so produced there is added a silica-alumina hydrogel. This hydrogel may be produced by coprecipitation of silica gel from an alkali silicate and alumina from an aluminum salt or an aluminate, or it may be produced by separate precipitation of the silica gel and alumina. Depending upon the amount of the silica-alumina added, this hydrogel may be freed of alkali metal components prior to addition or it may be employed after merely a dewatering operation. Thus, if only small amounts of the silica-alumina hydrogel are added, and if the hydrogel contains relatively limited amounts of alkali metal, the amount of alkali metal contained in the total composite is very restricted. In cases where larger amounts of silica-alumina are added, it is in general desirable to remove the alkali metal therefrom by washing, and in some instances by base exchange with ammonium salts prior to addition to the ground gel. It is preferred that the ratio of silica to alumina in the added hydrogel be in the range of about 1:1 up to 20:1. Sufficient silica-alumina hydrogel is added that the contact mass produced, on dry basis, contains between about 1% and 40% of silica. It has been found that generally with the type of contact mass here involved silica within this range has little or no effect upon the catalytic properties thereof. Greater proportions of the hydrogel appear to reduce the activity of the mass due to a dilution effect. The mixture of dry ground gel and hydrogel is then dried. Prior to drying it may be formed in pellet or other suitable shape, or, alternatively, it may be dried as a mass, crushed and calcined to give particles of the desired size. In case the material is formed as pellets, it may be desirable to add water to make the mix thinner so as to be more appropriate for forming operations.

If desired, hydrogels of silica and alumina may be separately added to the dry ground gel instead of adding the two in mixture and similar results are obtained.

Following the formation of the mixture into dried pieces, it is calcined to prepare it for use as a catalyst body. The temperature of calcination is in general between about 600° F. and 1500° F. The temperature should be not above that at which the surface area is substantially reduced, and in the case of molybdenum lower temperatures than 1500° F. are desirable to avoid losses of this material. With some volatile salts, temperatures greater than 600° are desirable due to the high temperature at which the salts are decomposed, as for example with ammonium sulfate a temperature of at least 850° F. is desirable. The catalyst after drying may be charged to the catalyst case and the heat treatment (calcination) be effected therein. Hydrogen, if desired, may be present during the heat treatment. This calcination not only drives off the volatile salt but also hardens the catalyst. The catalysts of this invention are characterized by having a hardness of over 1,000 when tested as described in Example 1. It should be noted that the invention is directed to the use of silica-alumina in the form of a hydrogel, since other forms of silica-alumina gel will not always develop the hardness of the catalyst on calcination.

The reducible oxides to which this invention relates are oxides of a group of quite similar metals. In fact, the similarity is much greater than in general exists within a single periodic group. For example, chromium, vanadium, and molybdenum are polyvalent, multivalent, high-melting metals. They all form hydrous oxides. They all are readily oxidizable and reducible between at least two of the valences. At least one of the oxides of each is soluble to a marked extent in water.

The following examples describe specific applications of this invention. These examples are intended as illustrative thereof only and should not be considered as indicative of the scope thereof.

Example 1

A catalyst was prepared as follows: A 6.26 liter solution was prepared containing 626 grams of ammonium molybdate $(NH_4)_6Mo_7O_{24}.4H_2O$, 282 c. c. of aqua ammonia of 28% concentration and enough water to bring it up to the desired volume. This was added with stirring to a 24 liter aqueous solution containing 5 kg. of aluminum nitrate $Al(NO_3)_3.9H_2O$. The mixture was stirred until the precipitate, which was initially formed, dissolved. To this mixture 4 liters of aqua ammonia prepared by diluting 2.54 liters of 28% aqua ammonia with water was added with stirring. The precipitate formed was separated from the liquor by filtration, dried at 180° F., and ground in a ball mill for three hours. To this dry ground gel a silica-alumina hydrogel was added in quantity on dry basis to equal 23% of the composite. The silica-alumina weight ratio of the added hydrogel was equal to 9 and the hydrogel was substantially free of alkali metal. This mixture was cast in pellets and dried at 105° C., following which it was heat treated at 900° F. in the presence of hydrogen. The catalytic properties of the mass for the production of toluene from normal heptane were found not reduced due to the inclusion of the silica-alumina hydrogel, being capable of converting 29% to aromatics at a run temperature of 900° F. at a rate of 13/20 (13 volumes of charge liquid basis per 20 volumes of catalyst per hour). Pellets were prepared to test the strength of the material. For this purpose pellets were prepared from the mixture of dried gel and hydrogel, 4 mm. in diameter and 4 mm. long, which were dried and heat treated in the same manner. The pellets so formed were sufficiently strong to withstand a force of 2910 grams applied through a knife edge, of the type employed in analytical balances and the like, with the knife edge applied across the axis of the pellet.

Example 2

A silica-alumina gel was prepared which contained 12.6 parts alumina per 87.4 parts silica by continuously mixing a solution of soluble sodium silicate and a solution of sodium aluminate. The solutions were of a concentration to contain 9 parts of silica and alumina on dry basis per 100 parts of solution. One part of an ammonium sulfate solution was continuously added to the mixture per three parts of mixture, the ammonium sulfate being of a concentration to effect the precipitation at 9.6 pH. The gel so produced was washed with water. One part of the wet washed gel (dry weight basis) was blended with nine parts of dry ground alumina-molybdenum oxide gel produced as in Example 1. This mixture was molded, dried, and heat treated as above stated. The mechanical strength of the heat treated pellets when tested as described with a knife edge was found to be about 2100 grams. Under the described conditions for conversion of normal heptane to toluene this catalyst produced 23% of aromatics.

Example 3

A gel was prepared by adding 41.7 c. c. of 24% aqueous ammonia to a 450 c. c. aqueous solution of 37.5 grams of aluminum nitrate $$(Al(NO_3)_3 \cdot 9H_2O)$$

The aluminum monohydrate so produced was vacuum filtered until fairly dry with respect to mechanically held water. 4.5 grams of chromic oxide ($CrO_3$) were dissolved in a minimum quantity of the filtrate. The filtered alumina was ground with the solution of chromic oxide, yielding a thick paste, yellowish in color. The paste was dried at 100° C. and formed a black, vitreous solid, following which it was ground and finished with a silica-alumina hydrogel as described in Example 2. The catalyst is active in the dehydrogenation of hydrocarbons.

I claim as my invention:

1. The method of catalyst preparation comprising precipitating a hydrogel of alumina and a slightly soluble oxide of a polyvalent, multivalent metal selected from the group consisting of molybdenum, chromium, and vanadium, effecting said precipitation with the concomitant production of a volatile ammonium salt, drying the hydrogel, grinding the dried gel, mixing the ground gel with hydrogels of silica and alumina, drying the mixture, and heat treating the dried mixture, without previously washing to remove the volatile salt, at a temperature between about 600° F. and 1500° F., whereby the volatile salt is driven off.

2. The method defined in claim 1 further characterized in the silica and alumina hydrogels being in mixture when mixed with the dried gel.

3. The method of catalyst preparation comprising interacting in solution an aluminum salt with an ammonium metallate selected from the group consisting of molybdates, chromates, and vanadates, the aluminum salt being so selected that the salt formed during said interacting is a salt volatile below about 1500° F., and drying and then grinding the precipitate formed by said interacting, mixing the resulting ground gel with a hydrogel of silica and alumina, drying the mixture and heat treating the dried mixture, without previously washing to remove the volatile salt, at a temperature between about 600° F. and 1500° F., whereby the volatile salt is driven off.

4. The method of catalyst preparation comprising precipitating a hydrogel of alumina and a slightly soluble oxide of a polyvalent, multivalent metal selected from the group consisting of molybdenum, chromium, and vanadium in the presence of ammonium cations and anions which together form volatile salts, drying and grinding the hydrogel, mixing the resulting ground gel with a hydrogel of silica and alumina, forming the mixture into pellets, drying the pellets so formed, and heat treating the pellets, without previously washing to remove the volatile salt at a temperature between about 600° F. and 1500° F. to eliminate the volatile salt and to develop the hardness of the pellets.

5. The method defined in claim 1 further characterized in that the hydrogels of silica and alumina are coprecipitated.

JOHN R. BATES.